United States Patent [19]

Miyazawa et al.

[11] Patent Number: 5,150,958
[45] Date of Patent: Sep. 29, 1992

[54] VEHICULAR HEADLAMP HAVING INCLINATION MEASURING UNIT

[75] Inventors: Kenji Miyazawa; Hidetoshi Terao, both of Shizuoka, Japan

[73] Assignee: Koito Manufacturing Co., Ltd., Tokyo, Japan

[21] Appl. No.: 798,953

[22] Filed: Nov. 27, 1991

[30] Foreign Application Priority Data

Nov. 29, 1990 [JP] Japan .................. 2-325361

[51] Int. Cl.⁵ ............................................. F21M 3/20
[52] U.S. Cl. .................................... 362/66; 362/80; 362/428; 33/370
[58] Field of Search ................. 362/61, 66, 80, 287, 362/429, 273, 282, 427; 33/288, 365, 370

[56] References Cited

U.S. PATENT DOCUMENTS 5,063,480 11/1991 McMahan et al. .
5,065,293 11/1991 Mochizuki .......................... 362/61
5,067,052 11/1991 Suzuki et al. ....................... 362/61
5,068,769 11/1991 Umeda et al. ...................... 362/61
5,077,642 12/1991 Lisak .................................. 362/66

Primary Examiner—Richard R. Cole
Attorney, Agent, or Firm—Sughrue, Mion, Zinn, Macpeak & Seas

[57] ABSTRACT

A vehicular headlamp having an inclination measuring unit mounted on portions of an aiming screw which extends rearward from reference member. The inclination measuring unit is interposed between a reference member and the rear end portion of the aiming screw, protruding rearward from the reference member. The inclination measuring unit includes a cylindrical transparent casing surrounding the aiming screw and fixed at one end to the reference member, a cylindrical base accommodated in the transparent casing in such a manner as to be rotatable when the aiming screw is turned, a ring-shaped slide member engaged threadably with a male-threaded outer cylindrical wall of the cylindrical base, the slide member being slid axially by rotation of the cylindrical base while being prevented from being turned relative to the transparent casing, a coupling member extending through an opening formed in the transparent casing into the cylindrical base to engage with tapered engaging portions of the cylindrical base and with outside surfaces of the aiming screw to couple the aiming screw with the cylindrical base, and a scale formed on the transparent casing and a reference line formed on said slide member to indicate the amount of relative displacement of the inclination member. With the invention, unlike the prior art, it is not necessary to provide a fine adjustment mechanism for adjusting the scale following initial zero-point adjustment.

20 Claims, 6 Drawing Sheets

VEHICULAR HEADLAMP HAVING INCLINATION MEASURING UNIT

BACKGROUND OF THE INVENTION

The present invention relates to a vehicular headlamp having an inclination measuring unit for determining whether or not the direction of irradiation of the headlamp, that is, the angle of irradiation of the headlamp in a horizontal plane, is correct. More particularly, the invention relates to a vehicular headlamp having an inclination measuring unit with which the angle of irradiation of the lamp can be corrected with ease when it is found not to be correct.

By way of example, a movable reflector type headlamp will be described in which a reflector is tiltably supported in the lamp body. As shown in FIG. 11, the rear wall of the reflector 202 is supported at three points on the lamp body 201, namely, with two aiming screws 203 and 204 extending in the axial direction of the headlamp, and with a swinging fulcrum 205. (Since FIG. 11 is a front view of the reflector, the aiming screws 203 and 204 extend perpendicular to the surface of the drawing.) More specifically, the aiming screws 203 and 204 are threadably and rotatably supported on the rear wall of the lamp body 201. The reflector supporting points of the aiming screws 203 and 204 are arranged so that two straight lines connecting the supporting points and the swinging fulcrum 205 form right angles, for instance. The aiming screws 203 and 204 are turned to swing the reflector 202 about the horizontal axis $L_x$ and the vertical axis $L_y$, respectively, thereby to adjust the angle of irradiation of the headlamp. In FIG. 11, reference numeral 206 designates a light source, namely, a light bulb fitted in the reflector 202.

On the other hand, a so-called movable unit type headlamp (not shown) is available in which a lamp-body reflector unit is tiltably supported on the lamp housing. In this case, the reflector is integrally formed on the inner wall of the lamp body. In the movable unit type headlamp, similarly as in the movable reflector type headlamp, the lamp-body reflector unit is supported on the lamp housing with one swinging fulcrum and two aiming screws. The aiming screws are turned to tilt the lamp-body reflector, thereby to adjust the angle of irradiation of the headlamp.

That is, by turning the two aiming screws, a tilting member (the reflector in the case of the movable reflector type headlamp and the lamp-body reflector in the case of the movable unit type headlamp) on which the light reflecting surface is formed is tiltably adjusted to set the direction of irradiation of the headlamp. The tilting member thus can be swung vertically (about the horizontal axis) and horizontally (about the vertical axis) with respect to a reference member (the lamp body in the case of the movable reflector type headlamp and the lamp housing in the case of the movable unit type headlamp) to adjust the angle of irradiation of the headlamp.

Recently, a variety of devices for measuring the angle of irradiation of a headlamp in a horizontal plane have been proposed. In this regard, the present applicant has disclosed various such measuring devices in Japanese Patent Application No. 154630/1988 and Japanese Utility Models Applications Nos. 98397/1988, 121576/1988 and 43979/1989.

However, the conventional measuring devices have certain drawbacks. First, the measuring devices are generally designed so that a measuring unit for measuring the amount of inclination of the tilting member in a horizontal plane is provided between the tilting member and the reference member. The measuring unit is positioned on the upper portion of the headlamp so as to facilitate the reading of the indication. Accordingly, the resultant headlamp is relatively large in height. This goes against the recent tendency to reduce the height of a headlamp as much as possible. In a movable reflector type headlamp, the measuring unit is arranged in the lamp body, and is thus inconvenient to read.

The aforementioned Japanese Patent Application No. 154630/1988 has proposed a measuring unit having a scale section protruding behind the reference member. However, the measuring unit is still disadvantageous in that it is necessary to form holes in the reference member to mount the measuring unit, which is rather troublesome to accomplish. In addition, adjustment is rather difficult when the measuring unit is installed on the headlamp.

Moreover, when the measuring device is disposed between the tilting member and reference member, it is generally necessary to provide a fine adjustment mechanism to adjust the scale of the measuring device for zero-point adjustment. This significantly complicates the structure of the device and complicates its use.

SUMMARY OF THE INVENTION

In view of the foregoing, an object of the present invention is to provide a vehicular headlamp having an inclination measuring unit for which it is not necessary to provide a fine adjustment mechanism for adjusting the scale of the measuring device relative to a reference member.

A further object of the present invention is to provide a vehicular headlamp having an inclination measuring unit constructed such that it is unnecessary to modify the reference member to mount the measuring unit, and which can be mounted on portions of the aiming screws which extend rearward from the reference member, thereby allowing a reduction of the height of the headlamp.

The foregoing and other objects of the invention have been met by a vehicular headlamp of a movable inclination member type in which an inclination member with a light reflecting surface for setting the direction of irradiation of the lamp is supported at three points by a swinging fulcrum supported on a reference member, and a horizontal aiming screw and a vertical aiming screw which penetrate the reference member along the axis of the headlamp are supported by the reference member, the horizontal and vertical aiming screws being turned to adjust an inclination of the inclination member in a horizontal plane and in a vertical plane, respectively, to adjust the angle of irradiation of the headlamp, and an inclination measuring unit is provided to measure an angle of inclination of the movable inclination member, the improvement wherein the inclination measuring unit is interposed between the reference member and a rear end portion of at least one of the aiming screws which protrudes rearward from the reference member, the inclination measuring unit determining the angle of inclination of the movable member by an amount of rotation of the at least one of the aiming screws following a zero-point adjustment of the inclination measuring unit.

The foregoing and other objects of the invention have also been achieved by the provision of a vehicular headlamp of the movable inclination member type having an inclination measuring unit comprising an inclination member with a light reflecting surface for setting the direction of irradiation of the lamp, the inclination member being supported at three points, namely, a swinging fulcrum supported on a reference member, and on a horizontal aiming screw and a vertical aiming screw which are laid in such a manner as to penetrate the reference member along the axis of the headlamp and which are supported by the reference member, the horizontal and vertical aiming screws being turned to adjust the angle of inclination of the inclination member in respective horizontal and vertical planes to adjust the angle of inclination of the headlamp; and an inclination measuring unit interposed between the reference member and the rear end portion of each of the aiming screws and which protrudes rearward from the reference member, the inclination measuring unit comprising:

a transparent casing surrounding the horizontal aiming screw, the transparent casing being in the form of a cylinder, the base end of which is fixedly secured to the reference member;

a cylindrical base accommodated in the transparent casing in such a manner as to be rotatable when the horizontal aiming screw is turned, the cylindrical base having a male-threaded outer cylindrical wall;

a ring-shaped slide member engaged threadably with the male-threaded outer cylindrical wall of the cylindrical base, the slide member being slid axially by rotation of the cylindrical base while being prevented from being turned relative to the transparent casing;

a coupling member extending through an opening formed in the transparent casing into the cylindrical base, to engage with tapered engaging portions of the cylindrical base and with outside surfaces of the aiming screw to couple the aiming screw with the cylindrical base; and a scale formed on said transparent casing and a reference line formed on said slide member to indicate an amount of relative displacement of the inclination member.

The invention can be applied to a movable reflector type headlamp in which the reference member is a lamp body, and the inclination member is a reflector which can be tiltably adjusted inside the lamp body.

The invention can also be applied to a movable unit type headlamp in which the reference member is a lamp housing, and the inclination member is a lamp-body reflector unit having a reflector formed on its inner surface.

The aiming screw is coupled to the cylindrical base through the coupling member. Hence, by turning the aiming screw, the inclination member is tilted with respect to the reference member, and the slide member, which is threadably engaged with the cylindrical base and is prevented from being turned with respect to the transparent casing, is moved back and forth along the transparent casing.

The amount of inclination of the inclination member with respect to the reference member is proportional to the amount of movement of the slide member with respect to the transparent casing. The amount of inclination of the inclination member with respect to the reference member, that is, the amount of deviation of the angle of irradiation of the headlamp, is indicated as a displacement on the scale due to the movement of the slide member, which is threadedly engaged with the cylindrical base coupled to the aiming screw through the coupling member, with respect to the transparent casing, which is fixedly secured to the reference member. Hence, it can be determined from the reading on the scale whether or not the angle of irradiation of the headlamp is correct.

When it is not correct, the reading on the scale indicates how much the angle of irradiation deviates from the proper setting. The angle of irradiation can be adjusted by turning the aiming screw until the deviation is zeroed.

The inclination measuring unit for detecting the amount of inclination of the inclination member is provided between the reference member and the rear end portion of the aiming screw, which protrudes rearward from the reference member. Hence, it is unnecessary to precisely machine the reference member to install the inclination measuring unit. Since the inclination measuring unit is provided behind the reference member, the resultant headlamp is relatively low in height.

DESCRIPTION OF THE PREFERRED EMBODIMENTS

Preferred embodiments of the invention will now be described with reference to the accompanying drawings.

Figure 1:
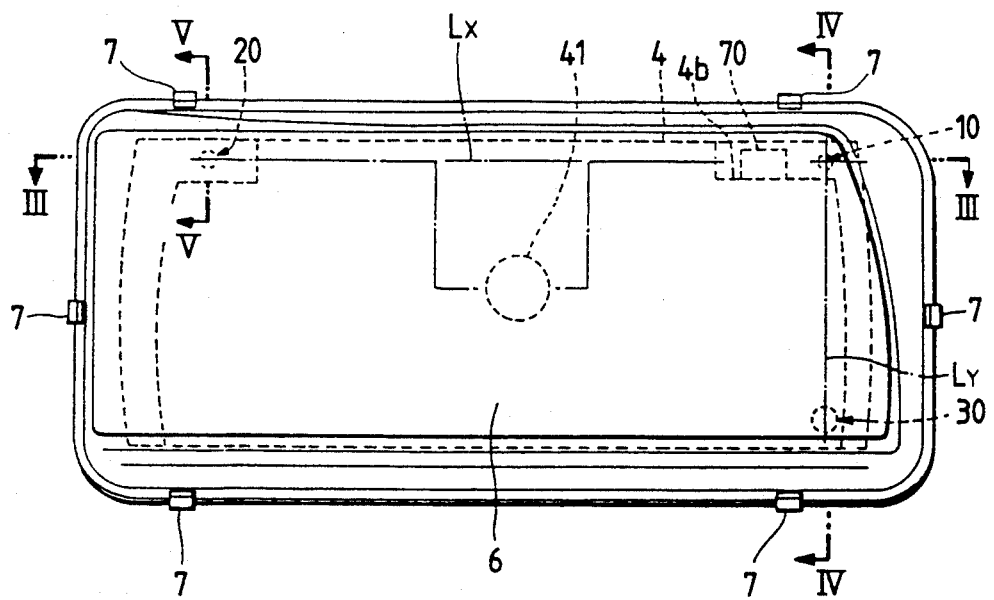
FIG. 1 is a front view of an example of a movable reflector type headlamp to which the technical concept of the invention is applied.
Figure 2:
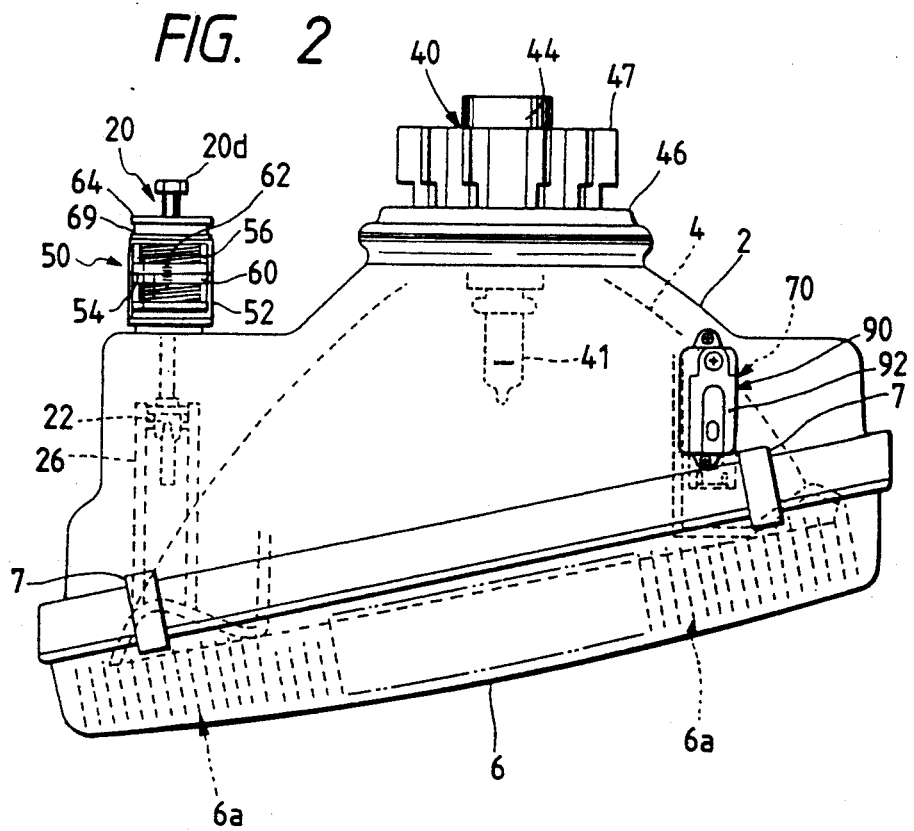
FIG. 2 is a plan view of the headlamp of FIG. 1.
Figure 3:
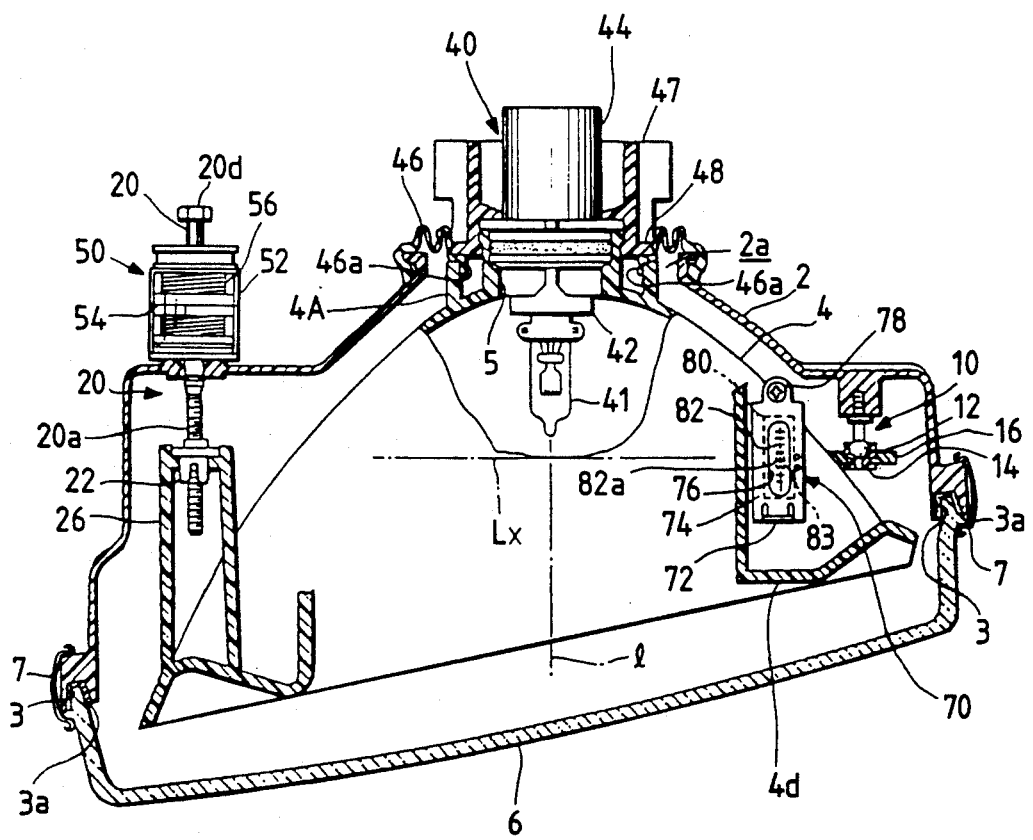
FIG. 3 is a sectional view taken along a line III—III in FIG. 1.
Figure 4:
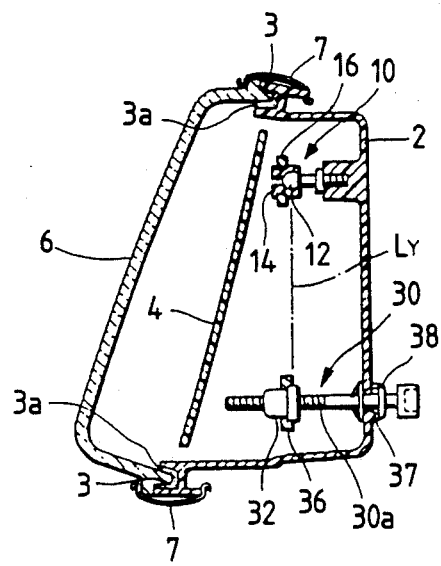
FIG. 4 is a sectional view taken along a line IV—IV in FIG. 1.
Figure 5:
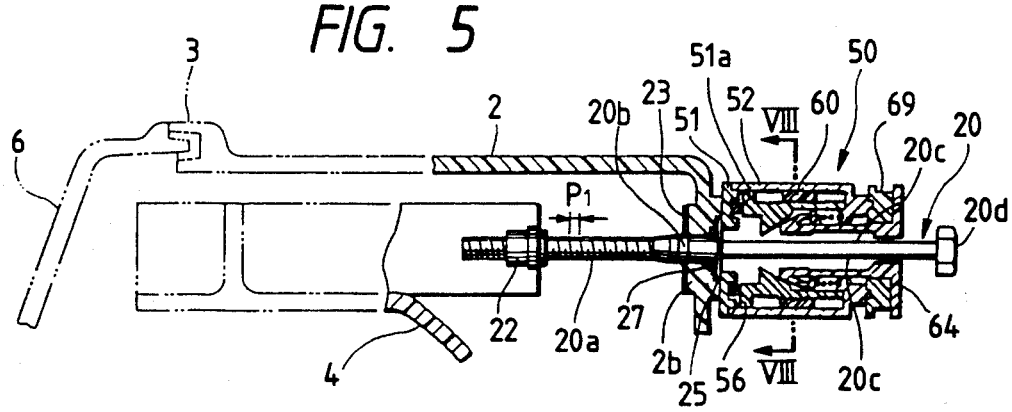
FIG. 5 is an enlarged vertical sectional view (taken along a line V—V in FIG. 1) showing an inclination measuring unit adapted to measure the angle of irradiation, in a horizontal plane, of headlamp components.
Figure 6:
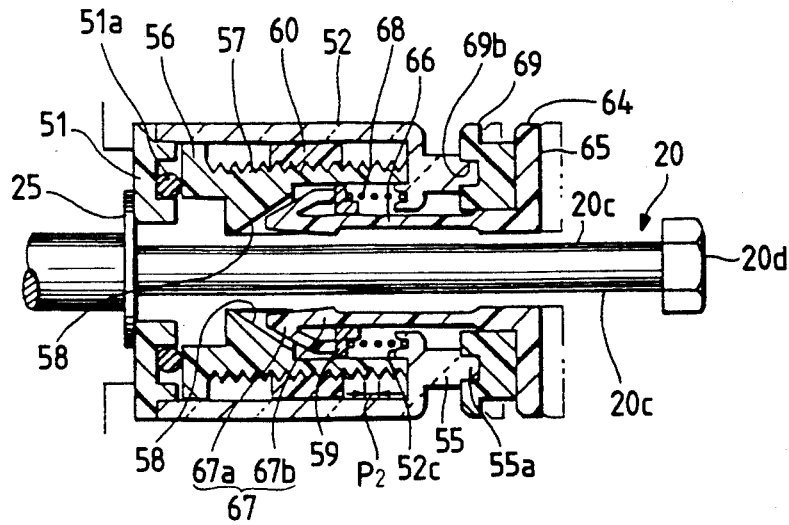
FIG. 6 is an enlarged vertical sectional view of the inclination measuring unit subjected to zero point adjustment.
Figure 7:
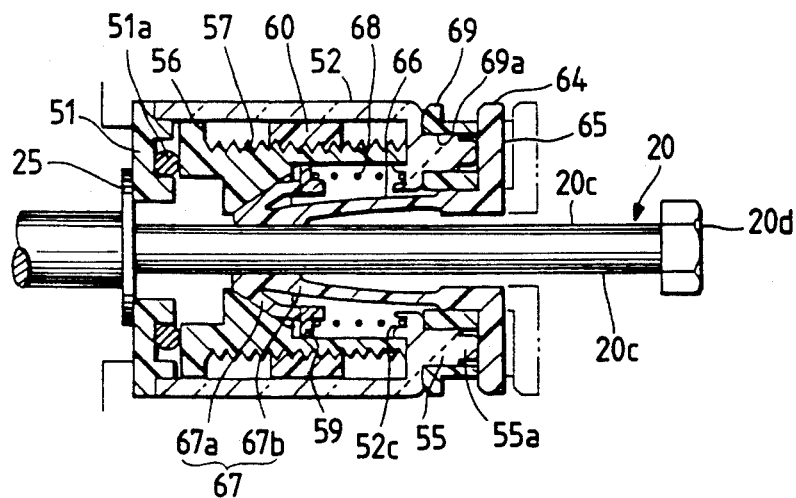
FIG. 7 is an enlarged sectional view of the inclination measuring unit which has been set.
Figure 8:
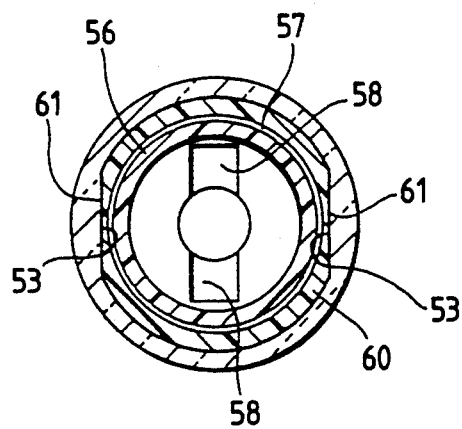
FIG. 8 is a sectional view of the inclination measuring unit without a coupling member.
Figure 9:
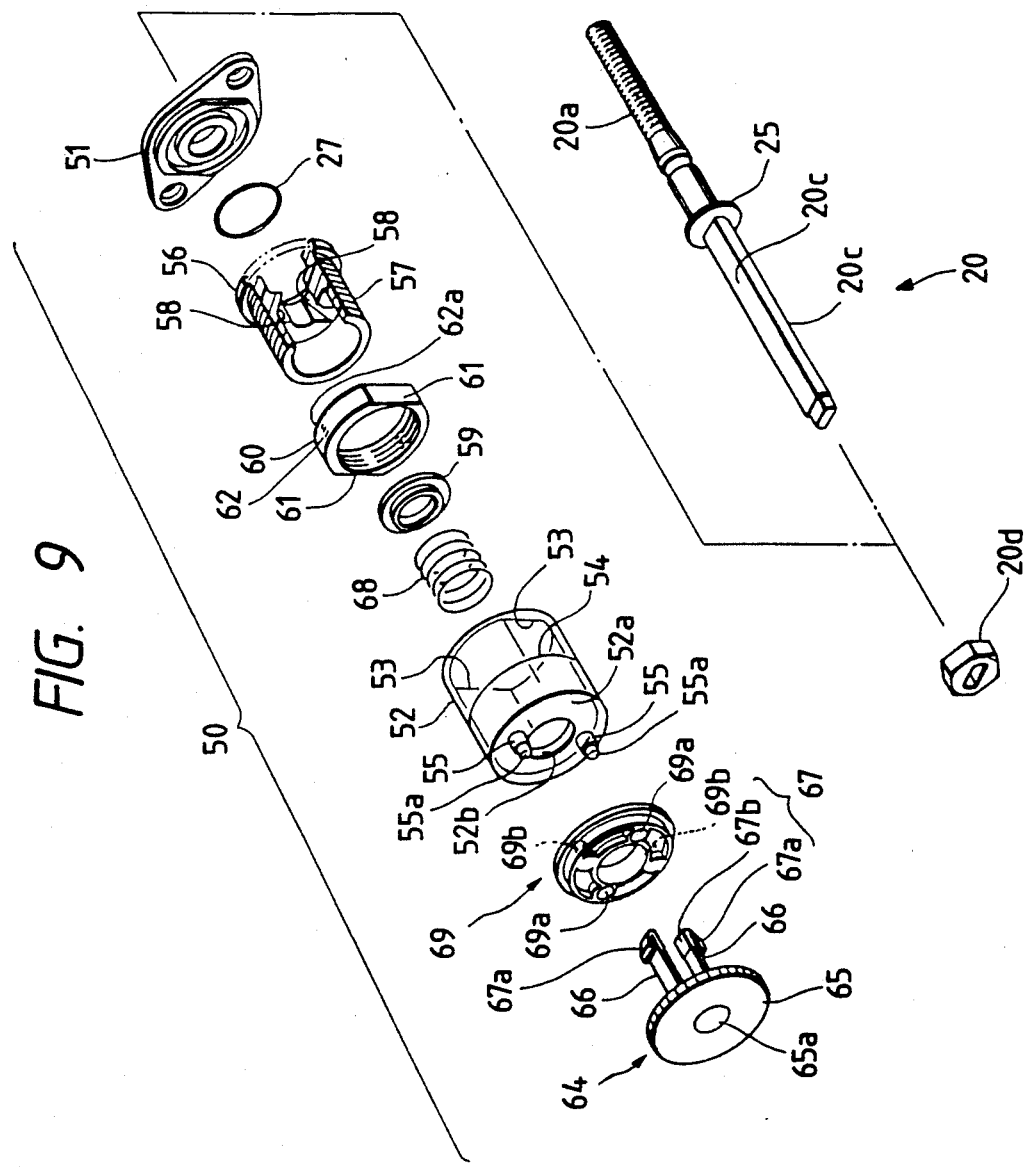
FIG. 9 is an exploded perspective view of the inclination measuring unit.

FIGS. 1 through 9 shows an example of a movable reflector type headlamp, which employs its lamp body as a reference member and with its reflector as an inclination member, to which the technical concept of the invention is applied. FIG. 1 is a front view of the movable reflector type headlamp. FIG. 2 is a plan view of the headlamp. FIG. 3 is a horizontal sectional view taken along a line III—III in FIG. 1. FIG. 4 is a vertical sectional view taken along a line IV—IV in FIG. 1. FIG. 5 is a vertical sectional view (taken along a line V—V in FIG. 1) showing an inclination measuring unit adapted to measure the angle of irradiation, in a horizontal plane, of the headlamp and components around it. FIG. 6 is an enlarged vertical sectional view of the inclination measuring unit, which is subjected to zero point adjustment. FIG. 7 is an enlarged sectional view of the inclination measuring unit which has been set. FIG. 8 is a sectional view taken along a line VIII—VIII in FIG. 5 with a coupling member eliminated. FIG. 9 is an exploded perspective view of the inclination measuring unit.

In these figures, reference numeral 2 designates a container-shaped lamp body in which a reflector 4 is disposed. A front lens 6 is engaged with the rectangular front opening of the lamp body.

The reflector 4 is supported, at three points, by a ball joint 10, a horizontal aiming screw 20, and a vertical aiming screw 30. The side of the ball 12 of the ball joint 10 is supported by the lamp body 2 in such a manner that the reflector 4 is swingable about the ball joint 10. The aiming screws 20 and 30 are rotatably supported by the lamp body 2, and their male-threaded front end portions 20a and 30a are engaged with respective nuts 22 and 32 provided on the side of the reflector 4. The ball 12 of the ball joint 10 is supported by a socket 14 which is fixedly supported on a bracket 16 protruding from the rear wall of the reflector. The nuts 22 and 32 engaged with the male-threaded portions 20a and 30a of the aiming screws are fixedly supported by respective brackets 26 and 36 protruding from the rear wall of the reflector. Hence, by turning the aiming screws 20 and 30, the nuts 22 and 32 are moved along the aiming screws 20 and 30 to change the angle of inclination of the reflector 4.

The reflector supporting point of the horizontal aiming screw 20 (i.e., the threaded engaging point of the aiming screw 20 and the nut 22) is on the horizontal axis $L_X$, which is perpendicular to the axis of irradiation 1 (see FIG. 3) of the headlamp and passes through the ball joint 10. The reflector supporting point of the vertical aiming screw 30 (i.e., the threaded engaging point of the aiming screw 30 and the nut 32) is on the vertical axis $L_Y$, which is perpendicular to the axis of irradiation 1 of the headlamp and passes through the ball joint 10. Hence, by turning the aiming screw 20, the nut 22 is moved along the aiming screw 20 to cause the reflector 4 to swing about the vertical axis $L_Y$. This operation adjusts the inclination, in a horizontal plane, of the inclination member; that is, the reflector 4 is adjusted with respect to the reference member, namely, the lamp body. The angle of irradiation of the headlamp in the horizontal plane is adjusted in this manner.

Similarly, by turning the aiming screw 30, the nut 32 is moved along the aiming screw 30 to cause the reflector 4 to swing about the horizontal axis $L_X$ perpendicular to the vertical axis $L_Y$. This operation adjusts the inclination, in a vertical plane, of the inclination member, here the reflector 4, with respect to the reference member, namely, the lamp body 2; that is, the angle of irradiation, in a vertical plane, of the headlamp is adjusted. In other words, the angle of inclination of the reflector 4, i.e., the angle of irradiation of the headlamp, can be adjusted by turning the two aiming screws 20 and 30.

In FIG. 3, reference numeral 40 designates a bulb socket with which a light bulb 41 is engaged integrally. The lamp body 2 has an opening 2a in its rear wall through which the bulb socket is mounted on or dismounted from the reflector. More specifically, the bulb socket 40 is fitted in a socket hole 5 formed in the rear conical wall of the reflector 4 in such a manner that the socket hole 5 is located in the opening 2a of the lamp body 2. A rubber cover 46 is mounted on the rear conical wall of the reflector 4 to close the gap between the reflector 4 and the lamp body 2.

Further in FIG. 3, reference numeral 47 designates a locking cap adapted to secure the bulb socket 40 by pushing it against the socket hole 5. More specifically, a flange 48 formed on the locking cap 47 at the front end pushes the inner peripheral portion 46a of the rubber cover 46 against a circular wall 4a formed on the rear conical wall of the reflector 4. Further in FIG. 3, reference numeral 42 designates a base in which the bulb 41 is fitted, and 44, a cylindrical connector in which connecting terminals are provided.

FIGS. 1 through 4, reference numeral 3 designates a seal groove formed in the lamp body 2 along the front opening. The rim of the front lens 6 is engaged with the seal groove 3 through a sealing agent 3a filled therein. Reference numeral 7 indicates clips which mechanically fasten the front lens 6 to the lamp body 2. In FIG. 2, reference numeral 6 designates diffusion steps formed in the inner surface of the side wall of the front lens 6 to make unnoticeable the leakage of light from the side wall of the front lens.

Reference numeral 50 designates a first inclination measuring unit provided between the lamp body 2 and the rear end portion of the horizontal aiming screw 20, which extends rearward from the lamp body 2. The first inclination measuring unit is used to measure the amount of inclination, in a horizontal plane, of the reflector 4, that is, the angle of irradiation, in a horizontal plane, of the headlamp. The first inclination measuring unit is shown in FIGS. 5 through 9 in more detail.

The inclination measuring 50 includes a transparent casing 51 which is fixedly secured through a base plate 51 to the lamp body 2 in such a manner as to surround the aiming screw, a cylindrical base 56 arranged in the transparent casing 52 in such a manner that it is rotatable relative to the aiming screw 20, a slide member 60 engaged with a male thread 57 formed on the outer cylindrical surface of the base 56, the slide member 60 being prevented from being turned relative to the transparent casing, and a coupling member 64 disposed between the base 56 and the aiming screw 20 to couple the base 56 to the aiming screw 20. A reference line is marked on the transparent casing, and a scale 62 is marked on the slide member 60.

The horizontal aiming screw 20, which is arranged in such a manner as to penetrate the lamp body 2 along the horizontal axis, is supported on the lamp body 2 by a snap ring 23 engaged with a groove formed in the shank of the aiming screw 20, and a flange 25 formed on the shank. That is, the snap ring 23 and the flange 25 hold the portion 2b of the lamp body 2 from both sides, thereby to position the aiming screw 20 on the lamp body 2 in such a manner that the screw 20 can rotate but not move in its longitudinal direction. The rear end portion of the aiming screw 20, which protrudes rearward from the lamp body, is flattened on both sides, being rectangular in section; that is, it has side surfaces 20c opposed to each other. The side surfaces 20c form an engaging section with which flexible holding pieces 66 of the coupling member 64 engage. A hexagonal head 20d, serving as an aiming screw engaging member, is is formed on the aiming screw 20 at its rear end. An O-ring 27 is interposed between the lamp body 2 and the flange 25 of the aiming screw to hermetically seal the screw supporting region.

The transparent casing 52 is cylindrical. The transparent casing 52 surrounds the rear end portion of the aiming screw 20, which protrudes rearward from the lamp body, with the base end of the transparent casing 51 being secured to the base plate 51, which is fixedly connected to the lamp body. The base 56, which is substantially in the form of a cylinder, is accommodated in the transparent casing 51 in such a manner that it is rotatable relative to the casing 51 and the aiming screw 20. A male thread 57 is formed on the outer cylindrical wall of the base 56. The ring-like slide member 60 is engaged with the threaded outer cylindrical wall of the base 56. The slide member 60 has flat outer side walls 61 on both sides. The transparent casing 51 has flat side walls 53 on its inside in correspondence to the flat outer side walls 61 of the slide member 60, so that the slide member 60 is prevented from being turned relative to the transparent casing 52 (see FIG. 8). Hence, as the base 56 turns, the slide member 60 is slid axially (horizontally in FIGS. 6 or 7).

As shown in FIG. 9, the scale 62 is formed by marking lines on the outer cylindrical surface of the slide member 60 at predetermined intervals in the axial direction. On the other hand, the reference line 54 is marked on the transparent casing 52 in correspondence to the scale 62. In FIG. 9, reference numeral 62a designates the zero point position of the scale. A pair of tapered engaging portions 58 are formed on the inner cylindrical wall of the base 56. The tapered engaging portions 58 are engaged with the pair of flexible holding pieces 66 of the coupling member 64 (described later in more detail) under pressure.

The transparent casing 52 has an internal flange 52a at the rear end. The internal flange 52a has an opening 52b at the center through which the aiming screw 22 extends. A pair of guides 55 protrude from the internal flange 52a in such a manner that they are positioned on both sides of the opening 52b. The coupling member 64 is inserted into the opening 52b of the transparent casing to engage the tapered engaging portions 58 of the base 56, thereby to couple the latter to the aiming screw 20.

The coupling member 64, which is made of a synthetic resin, includes as a single unit a disk-shaped base end portion 65 positioned outside the internal flange of the transparent casing 52 and a pair of flexible holding pieces 66 extending from the base end portion 65 into the base 56 along the aiming screw 20. The flexible holding pieces 66, which are flexible with respect to the disk-shaped base end portion 65, each have an anchor-shaped end portion 57 composed of an outer piece 67a extending obliquely and an inner piece 67b with the former being flexible with respect to the latter. Hence, the coupling member 64 is pushed into the base 56 by the elastic force of a compression coil spring 68 (described later), as a result of which the anchor-shaped end portions 67 are engaged with the tapered engaging portions 58 of the base 56 and the side surfaces 20c of the aiming screw under pressure. Thus, the aiming screw 20 is coupled to the base 56 through the coupling member 64.

Reference numeral 59 designates a spring shoe mounted on the anchor-shaped end portions 67 of the flexible holding pieces 66. A compression coil spring 68 is interposed between the spring shoe 59 and a spring shoe 52c formed in the inside of the internal flange 52a of the base to urge the coupling member 64 to engage with the tapered engaging portions 58. A washer 69 is provided, as a spacing member, on the rear side of the base end portion 65 of the coupling member 64 in such a manner that it is rotatable with respect to the coupling member 64. The washer 69 has a pair guide holes 69a into which the pair of guides 55 of the transparent casing 52 can be inserted. When the guides 55 are engaged with the guide holes 69a, the coupling member is elastically urged into the base 56; that is, the aiming screw 20 is coupled to the base 56 through the coupling member 64.

The washer 69 has a pair of stopper holes 69b formed on a straight line perpendicular to the straight line connecting the guides holes 69a. The stopper holes 69b are engaged with small protrusions 55a extending from the ends of respective ones of the guides 55. When the small protrusions 55a of the guides 55 engage with the stopper holes 69b, the guides 55 can go no further into the stopper holes 69b, and therefore the elastic insertion of the coupling member 64 into the base 56 (i.e., the elastic engagement of the coupling member with the tapered engaging potions 58 of the flexible holding pieces 66 under pressure) cannot be achieved.

In other words, when the small protrusions 55a of the transparent casing engage with the stopper holes 69b, the flexible holding pieces 66 of the coupling member are spaced from the side surfaces 20c of the aiming screw 20. Hence, under this condition, it is impossible to turn the base 56 by turning the aiming screw 20. The coupling member 64 is prevented from being turned with the stopper holes 69b engaged with the guides 55 of the casing 52. Therefore, even if the base end portion 65 of the coupling member is touched, the coupling member 64 cannot be turned by itself so as to move the slide member 60, the zero point adjustment of which has been accomplished.

When, under the condition that the base 56 has been coupled to the aiming screw 20 through the coupling member 64, the aiming screw 20 is turned, the base 56 is also turned together with the aiming screw. In this operation, since the slide member 60 is engaged with the transparent casing 52 so as not to be turned, the slide member 60 is slid along the transparent casing 52. That is, the amount of movement of the reflector corresponds to the amount of movement of the scale 64 from the reference line (or the reference point position) 54. Hence, with the zero point position 62a of the scale 62 set to the reference point position 54 in advance, the amount of inclination of the reflection 4 can be read from the scale 62.

On the other hand, the pitch $P_2$ of the thread region of the slide member 60 and the base 56 is larger than the pitch $P_1$ of the aiming screw 20 and the nut 22 provided on the side of the reflector. Therefore, the amount of movement of the slide member 60, i.e., the amount of the movement of the scale 62, is $P_2/P_1$ times the amount of movement of the reflector 4. That is, the movement of the reflector 4 is amplified to display the amount of displacement on the scale. Hence, the amount of movement of the reflector can be read with ease, and the measurement can be achieved with high accuracy.

An example of a procedure of assembling the first inclination measuring unit 50 and combining it with the aiming screw 20 will now be described with reference to FIGS. 6 and 7.

First, the compression coil spring is held with the spring shoe 59 in the transparent casing 52. Next, the flexible holding pieces 66 of the coupling member 64 are inserted into the washer 69, and the stopper holes 69b of the washer are aligned with the small protrusions 55a of the casing. Under this condition, the flexible holding pieces 66 are inserted into the casing through the opening 52b while being set close to each other until the anchor-shaped end portions 67 engage the spring shoe 59.

The assembly of the base 56 and the slide member 60 is put in the transparent casing 52, and the zero point position 62a of the scale on the slide member 60 is aligned with the reference line 54 of the casing. Thereafter, the base end of the transparent casing 52 accommodating the coupling member 64, the base 56 and the slide member 60 are welded through an O-ring 51a to the base plate 51 by ultrasonic welding. Thus, the assembly of the inclination measuring unit 50 has been accomplished.

The rear end portion of the aiming screw 20 without the hexagonal nut 20d is inserted into the inclination measuring unit 50 thus formed to mount the latter on the aiming screw 20 in such a manner that the rear end portion of the aiming screw 20 protrudes behind the coupling member. Under this condition, the base plate 51 is fixedly secured to the lamp body 2 with screws (not shown). Thereafter, the washer 69 and the coupling member 64 are pulled slightly rearward against the elastic force of the compression coil spring 68 to pull the flexible holding pieces 67 out of the tapered engaging portions 58. Only the washer 69 is turned through 90° to allow the guide holes 69a to confront the guides 55. Under this condition, the washer 69 and the coupling member 64 are released. As a result, the coupling member 64 is pushed into the base 56 by the elastic force of the compression coil spring 68, so that the end portions of the flexible holding pieces 66 are abutted against the tapered engaging portions 58 of the base 56. Accordingly, the flexible holding pieces 66 are pushed towards each other, so that the anchor-shaped end portions 67 hold the side surfaces 20c of the aiming screw 20. Thus, the inclination measuring unit has been set on the aiming screw.

In FIGS. 1 through 3, reference numeral 70 designates a level, which constitutes a second inclination measuring unit for measuring the inclination, namely, in the vertical plane, of the reflector 4, thereby to determine the angle of irradiation, in a vertical plane, of the headlamp. The second inclination measuring unit 70 is mounted on the upper wall of the reflector at the right end. The level 70 includes a box-shaped casing 72 opening upward, and a level vial 80 provided in the casing 72. The scale of the level vial 80 is exposed through an opening 76 formed in the lid 74 of the casing 72.

In FIG. 3, reference numeral 82 designates the scale of the level vial, 82a, the zero point position of the scale, and 83, a bubble. The level vial 80 is positioned in the casing 72 in such a manner that the scale 81 is perpendicular to the horizontal axis $L_X$. Accordingly, the inclination of the reflector 4 about the horizontal axis $L_X$ is indicated as the displacement of the bubble 83 on the scale 82. Further in FIG. 3, reference numeral 78 designates a zero point adjusting screw. That is, the position of the bubble in the level vial 80 can be adjusted by turning the adjusting screw 78.

In FIG. 2, reference numeral 90 designates a rectangular window formed in the upper wall of the lamp body confronting the level 70. More specifically, the window 90 is formed by mounting a transparent cap 90 on an opening formed in the lamp body. Therefore, the bubble 83 and the scale 82 of the level vial 80 can be observed through the window 90, that is, the position of the bubble, which is indicative of the amount of inclination of the reflector 4 in a vertical plane, can be read through the window 90 with ease.

A procedure of adjustment of the inclination measuring units 50 and 70 which is carried out when the headlamp is installed on a vehicle body, and a procedure of adjustment of the angle of irradiation of the headlamp which is carried out thereafter will be described.

In the case of the first inclination measuring unit 50, the vehicle is set in a horizontal plane, a light distribution screen is set in place in front of the vehicle, and the headlamp is turned on. Under this condition, the horizontal aiming screw 20 is turned until the light distribution of the headlamp is set to a predetermined position, in a horizontal direction, on the light distribution screen (i.e., a position such that the axis of irradiation 1 of the headlamp coincides with the axis of the vehicle. In the inclination measuring unit 50, the stopper holes 69b of the washer are engaged with the small protrusions 55a of the guides 55 of the transparent casing, and therefore the base 56 is not coupled to the aiming screw 20 through the coupling member 64 yet. Hence, the coupling member 64 and the washer 69 is pulled slightly rearward against the elastic force of the compression coil spring 68 (as indicated by phantom lines in FIG. 6) to disengage the small protrusions 55a from the stopper holes 69b. Under this condition, while the base end portion 65 of the coupling member 64 is held by the operator in one hand, for instance, the left hand, the washer 69 is turned with the other hand (the right hand) until the small protrusions 55a engage the guide holes 69a, and then the base end portion 65 and the washer 69 are released. As a result, the elastic force of the compression coil spring 68 pushes the coupling member 64 into the base 56 from the position indicated by the phantom lines in FIG. 7, so that the base 60 is coupled to the aiming screw 20 through the coupling member 64. Thereafter, the amount of inclination of the reflector 4 can be indicated as an amount of displacement of the scale 62.

In the case of the second inclination measuring unit 70, the vertical aiming screw 30 is turned until the "hot zone" of the headlamp is set to a predetermined position, in a vertical direction, on the light distribution screen. However, in this adjustment, for instance, because of variations in the lamp mounting surface of the vehicle body, the bubble may not be at the zero point position 82a of the scale 82. In this case, the zero point adjusting screw 78 is turned until the bubble 83 is set at the zero point position 82a. Thus, under the condition that the angle of irradiation, in a vertical plane, of the headlamp is suitable, the adjustment is carried out so that the bubble in the level indicates the zero point 82a of the scale 82.

Thereafter, the user can easily perform adjustment of the angle of irradiation of the headlamp whenever necessary, that is, in the case where the reference point position 54 does not indicate the zero point position 62a of the scale, or the bubble in the level 70 (the second inclination measuring unit) is shifted from the zero point position of the scale. These amounts of shift are utilized to read the amount of deviation in the inclination, in a horizontal or vertical plane, of the reflector 4, that is, the deviation in the angle of irradiation, in a horizontal or vertical plane, of the headlamp.

In this case, the aiming screw 20 or 30 is turned so that, in the case of the first inclination measuring unit 50, the zero point position 62a is set to the reference point position 54, and in the case of the second inclination measuring unit, (the level 70) the bubble is set to the zero point position 82a. Thus, the angle of irradiation, in a horizontal or vertical plane, of the headlamp can be adjusted with ease.

Figure 10:
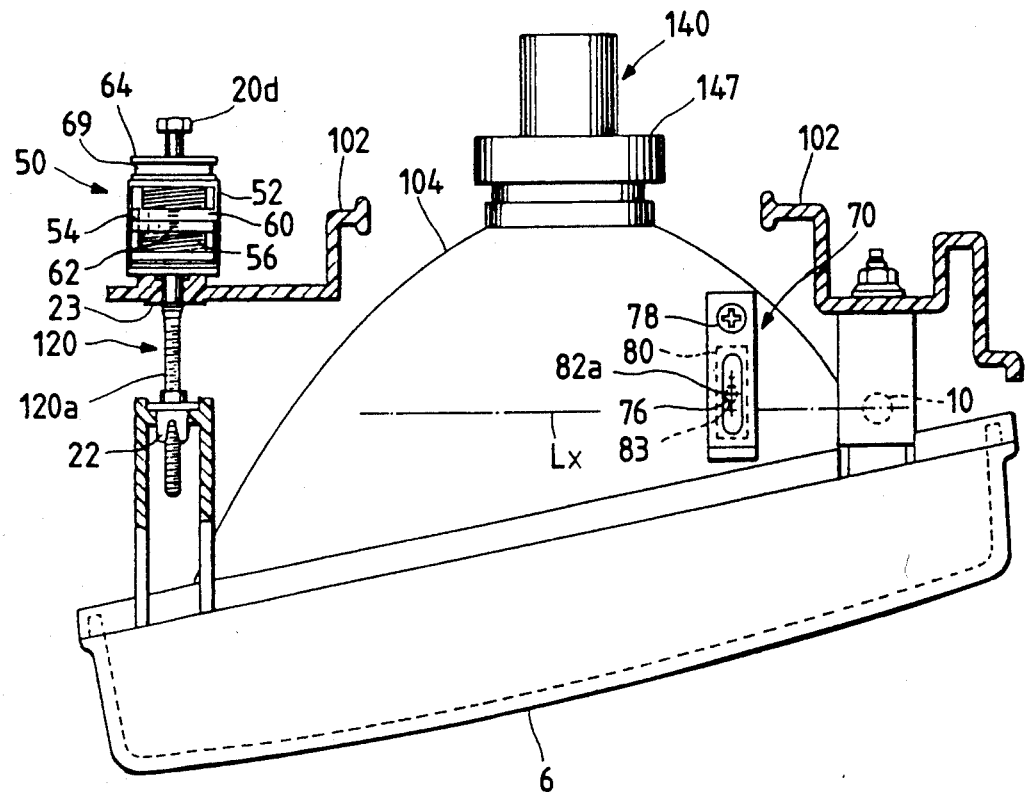
FIG. 10 is a plan view, with parts cut away, showing an example of a movable unit type headlamp to which the technical concept of the invention applied.
Figure 11:
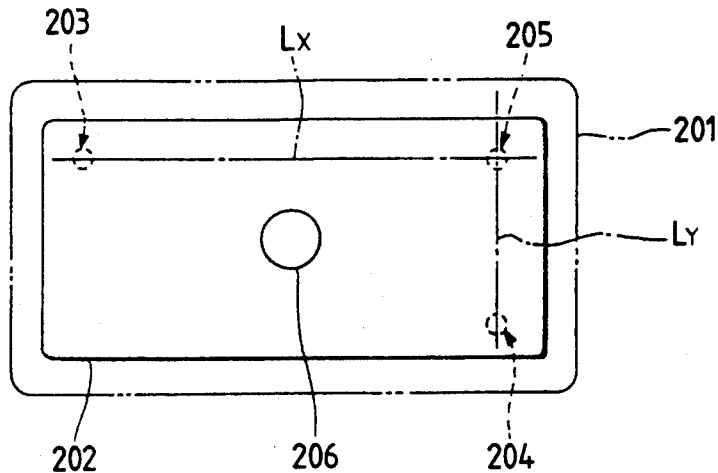
FIG. 11 is an explanatory diagram for a description of the reflector supporting structure in a movable reflector type headlamp.

FIG. 10 shows an example of a movable unit type headlamp, which uses its lamp housing as the reference member and the lamp body reflector unit (hereinafter referred to as "a lamp body unit", when applicable) as the inclination member and to which headlamp the technical concept of the invention is applied.

A first inclination measuring unit 50 for measuring the angle of inclination in a horizontal plane of the headlamp is provided between the lamp housing 102 and the male-threaded portion 120b of a horizontal aiming screw 120 which protrudes rearward from the lamp housing 102. A level 70, which is a second inclination measuring unit for measuring the angle of irradiation in a vertical plane of the headlamp, is mounted on the upper wall of the lamp body unit 104. The first and second inclination measuring units 50 and 70 are equal in structure to those in the above-described movable reflector type headlamp. Therefore, in FIG. 10, the parts of the first and second inclination measuring units 50 and 70 corresponding functionally to those in the above-described movable reflector type headlamp are designated by the same reference numerals or characters. Further in FIG. 10, reference numeral 140 designates a bulb socket, and 147, a locking cap fixing the bulb socket 140 in a socket hole formed in the lamp body unit.

In each of the above-described two embodiments, the inclination in a vertical plane of the headlamp is measured with the level. However, it should be noted that the inclination in a vertical plane of the headlamp can be measured with the first inclination measuring unit 50 by providing the first inclination measuring unit between the lamp body and the rear end portion of the aiming screw 30, which protrudes rearward from the lamp body, and aligning the reference line 54 with the zero point 62a of the scale when the headlamp is in its proper position in a vertical plane.

With this arrangement, the inclination, in a vertical plane, of the headlamp is indicated as an amount of displacement on the scale. Thus, the inclination in a vertical plane of the headlamp can be read and any deviation eliminated by turning the aiming screw 30 until the displacement of the scale is zeroed.

In the vehicle headlamp inclination measuring unit according to the invention as described above, the inclination of the inclination member (the reflector in the case of a movable reflector type headlamp and the lamp body in the case of a movable unit type headlamp) with respect to the reference member (the lamp body in the case of the movable reflector type headlamp and the lamp housing in the case of the movable unit type headlamp) is indicated as an amount of displacement of the scale by the inclination measuring unit provided between the aiming screw and the reference member. The amount of inclination of the inclination member, i.e., the angle of irradiation of the headlamp, can be read from the amount of displacement indicated on the scale.

The angle of irradiation of the headlamp, when it deviates from the proper angle, can be adjusted by turning the aiming screw until the scale of the inclination measuring unit is set to the predetermined position. Thus, the angle of irradiation of the headlamp can be adjusted by anyone with great ease.

As described above, the inventive inclination measuring unit is disposed between the reference member and the rear end portion of the aiming screw which protrudes rearward from the reference member. Hence, with the inclination measuring unit of the invention, unlike the conventional case, it is unnecessary to, for instance, precisely machine the reference member to form a hole for the installation of the inclination measuring unit. Moreover, it is not necessary to provide a separate fine adjustment mechanism for adjusting the position of the scale, as was required in the conventional case.

Furthermore, since the inclination measuring unit is provided behind the reference member, the scale can be read with ease, and the resultant headlamp is small in height; that is, a headlamp reduced in height can be provided according to the invention. In addition, when the headlamp is installed on the vehicle body, the space required for mounting the headlamp can be small in vertical dimension.

What is claimed is:

1. In a vehicular headlamp of a movable inclination member type in which an inclination member with a light reflecting surface for setting the direction of irradiation of said lamp is supported at three points of a swinging fulcrum supported on a reference member, and a horizontal aiming screw and a vertical aiming screw which penetrate said reference member and extend in directions generally parallel to an optical axis of said headlamp are supported by said reference member, said horizontal and vertical aiming screws being turned to adjust an inclination of said inclination member in a horizontal plane and in a vertical plane, respectively, to adjust the angle of irradiation of said headlamp, and an inclination measuring unit is provided to measure an angle of inclination of said movable inclination member, the improvement wherein said inclination measuring unit is interposed between said reference member and a rear end portion of at least one of said aiming screws which protrudes rearward from said reference member, said inclination measuring unit determining said angle of inclination of said movable member by an amount of rotation of said at least one of said aiming screws following a zero-point adjustment of said inclination measuring unit, said inclination measuring unit comprising a base member engaged with said rear end portion of said at least one of said aiming screws to be rotated by said screw, said base member having a male thread on an outer surface thereof, and a slide member threadably engaged with said male thread on said base member.

2. The vehicular headlamp as claimed in claim 1, wherein said inclination member comprises a reflector inclinably mounted inside a lamp body.

3. The vehicular headlamp as claimed in claim 1, wherein said reference member comprises a lamp body, and said inclination member comprises a lamp-body reflector unit on the inner surface of which a reflector is integrally formed.

4. The vehicular headlamp as claimed in claim 1, wherein a thread pitch of said male thread on said outer surface of said base member is greater than a thread pitch of said at least one of said aiming screws.

5. In a vehicle headlamp of a movable inclination member type in which an inclination member with a light reflecting surface for setting the direction of irradiation of said lamp is supported at three points by a swinging fulcrum supported on a reference member, and a horizontal aiming screw and a vertical aiming screw which penetrate said reference member and extend in directions substantially parallel to an optical axis of said headlamp are supported by said reference member, said horizontal and vertical aiming screws being turned to adjust an inclination of said inclination member in a horizontal plane and in a vertical plane, respectively, to adjust the angle of irradiation of said headlamp, the improvement comprising an inclination measuring unit interposed between said reference member and a rear end portion of at least one of said aiming screws which protrudes rearward from said reference member, said inclination measuring unit comprising:

- a transparent casing surrounding said aiming screw, said transparent casing being in the form of a cylinder, the base end of which is fixedly secured to said reference member;
- a cylindrical base accommodated in said transparent casing in such a manner as to be rotated when said aiming screw is turned, said cylindrical base having a male-threaded outer cylindrical wall;
- a ring-shaped slide member threadably engaged with the male-threaded outer cylindrical wall of said cylindrical base, said slide member being slid axially by rotation of said cylindrical base while being prevented from turning relative to said transparent casing;
- a coupling member extending through an opening formed in said transparent casing into said cylindrical base to engage tapered engaging portions of said cylindrical base and with outside surfaces of said aiming screw to couple said aiming screw to said cylindrical base; and
- a scale formed on said transparent casing and a reference line formed on said slide member to indicate an amount of relative displacement of said inclination member.

6. The vehicular headlamp as claimed in claim 5, wherein said inclination member comprises a reflector inclinably mounted inside a lamp body.

7. The vehicular headlamp as claimed in claim 5, wherein said reference member comprises a lamp body, and said inclination member comprises a lamp-body reflector unit on the inner surface of which a reflector is integrally formed.

8. The vehicular headlamp as claimed in claim 5, wherein a rear portion of said aiming screw is flattened, and wherein said coupling member comprises a pair of flexible holding pieces engaging said flattened portions of said aiming screw.

9. The vehicular headlamp as claimed in claim 5, wherein said aiming screw has a flange portion formed thereon, and further comprising a snap ring cooperating with said flange portion to mount said aiming screw on said reference member in such a manner that said aiming screw can rotate but not move in a longitudinal direction of said aiming screw.

10. The vehicular headlamp as claimed in claim 9, further comprising an O-ring disposed between said flange and an adjacent surface portion of said reference member to hermetically seal a region surrounding a rear end of said aiming screw.

11. The vehicular headlamp as claimed in claim 5, wherein said slide member has at least one flat side wall for preventing said slide member from turning relative to said transparent casing.

12. The vehicular headlamp as claimed in claim 5, wherein said base comprises a pair of tapered engaging portions formed on an inner wall thereof, and said coupling member comprises a pair of flexible holding pieces, said tapered engaging portions of said base being engaged with said pair of flexible holding pieces of said coupling member under pressure.

13. The vehicular headlamp as claimed in claim 5, wherein said transparent casing comprises an internal flange at a rear end thereof, said internal flange having an opening at a center thereof through which said aiming screw extends, said internal flange having a pair of guides protruding therefrom in such a manner that said guides are positioned on both sides of said opening, said coupling member being inserted into said opening to engage said tapered engaging portions of said base, thereby to couple said base to said aiming screw.

14. The vehicular headlamp as claimed in claim 5, wherein said transparent casing has an internal flange, and said coupling member has a disk-shaped base end portion positioned outside said internal flange of said transparent casing and a pair of flexible holding pieces extending from a base end portion of said coupling member into said base along said aiming screw.

15. The vehicular headlamp as claimed in claim 14, wherein said flexible holding pieces are flexible with respect to said disk-shaped base end portion, and each of said flexible holding pieces has an anchor-shaped end portion comprising an outer piece extending obliquely and an inner piece, said outer piece being flexible with respect to said inner piece.

16. The vehicular headlamp as claimed in claim 15, further comprising a compression coil spring for pushing said coupling member into said base.

17. The vehicular headlamp as claimed in claim 16, further comprising a first spring shoe mounted on said anchor-shaped end portions of said flexible holding pieces and a second spring shoe formed inside said base, said compression coil spring being interposed between said first and second spring shoes.

18. The vehicular headlamp as claimed in claim 17, further comprising a washer disposed at a rear side of said base end portion of said coupling member, said washer being rotatable with respect to said coupling member.

19. The vehicular headlamp as claimed in claim 18, wherein said washer has a pair of guide holes formed therein, said guides of said internal flange of said transparent casing being inserted into respective ones of said guide holes.

20. The vehicular headlamp as claimed in claim 18, wherein said washer further has a pair of stopper holes formed on a line perpendicular to a line connecting said guide holes, said stopper holes being engaged with respective protrusions of said guides.

* * * * *